(12) United States Patent
Shepherd

(10) Patent No.: US 10,389,004 B2
(45) Date of Patent: Aug. 20, 2019

(54) TEMPERATURE MANAGEMENT IN BATTERY ARRAYS

(71) Applicant: East Penn Manufacturing Co., Lyon Station, PA (US)

(72) Inventor: Ben Shepherd, Sydney (AU)

(73) Assignee: East Penn Manufacturing Co., Lyon Station, PA (US)

( * ) Notice: Subject to any disclaimer, the term of this patent is extended or adjusted under 35 U.S.C. 154(b) by 76 days.

(21) Appl. No.: 15/288,555

(22) Filed: Oct. 7, 2016

(65) Prior Publication Data

US 2017/0025725 A1 Jan. 26, 2017

Related U.S. Application Data

(63) Continuation of application No. PCT/US2015/024929, filed on Apr. 8, 2015.

(30) Foreign Application Priority Data

Apr. 9, 2014 (AU) .................................. 2014901306

(51) Int. Cl.
*H01M 10/6562* (2014.01)
*H01M 2/10* (2006.01)
*H01M 10/6566* (2014.01)
*H01M 10/613* (2014.01)
*H01M 10/627* (2014.01)
*H01M 10/6557* (2014.01)

(52) U.S. Cl.
CPC ..... *H01M 10/6562* (2015.04); *H01M 2/1072* (2013.01); *H01M 2/1077* (2013.01); *H01M 10/613* (2015.04); *H01M 10/627* (2015.04); *H01M 10/6557* (2015.04); *H01M 10/6566* (2015.04); *H01M 2220/10* (2013.01)

(58) Field of Classification Search
None
See application file for complete search history.

(56) References Cited

U.S. PATENT DOCUMENTS

2006/0104024 A1 5/2006 Wang et al.
2013/0183564 A1 7/2013 Wagner

OTHER PUBLICATIONS

PCT Notification, International Preliminary Report on Patentability, dated Oct. 20, 2016, 6 pages.
Examination Report No. 1, Australian Application No. 2015243872, dated Nov. 12, 2018, 4 pages.

*Primary Examiner* — Wyatt P McConnell
(74) *Attorney, Agent, or Firm* — Barley Snyder

(57) ABSTRACT

An array has batteries in which those at a higher level in the physical structure are spaced further apart from each other than those on the lower levels. This allows for a more even temperature to be maintained across the array.

18 Claims, 2 Drawing Sheets

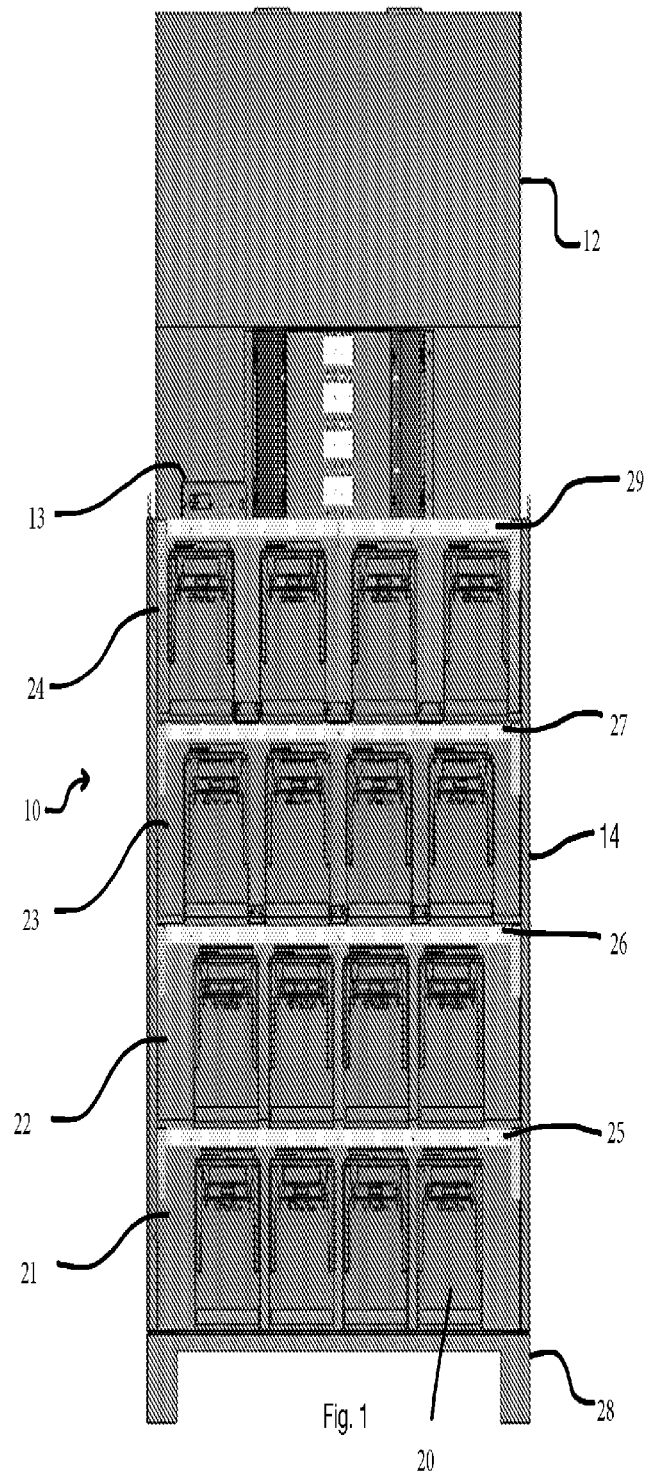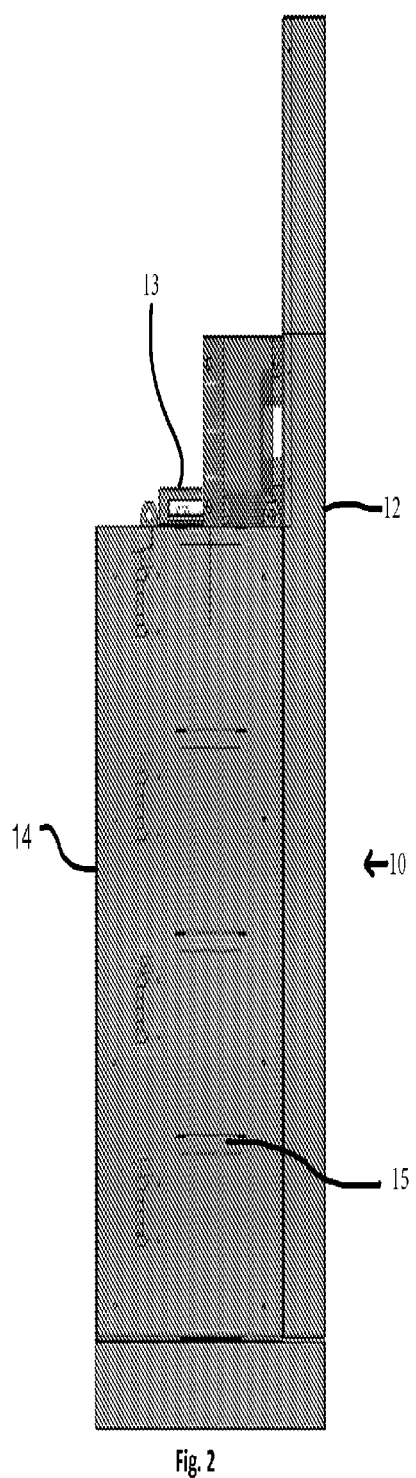

TEMPERATURE MANAGEMENT IN BATTERY ARRAYS

CROSS-REFERENCE TO RELATED APPLICATIONS

This application is a continuation of PCT International Application No. PCT/US2015/024929 filed Apr. 8, 2015, which claims priority under 35 U.S.C. § 119 to Australian Application No.: 2014901306, filed Apr. 9, 2014.

FIELD OF THE INVENTION

The present invention relates to the management of temperature in arrays of energy storage batteries.

BACKGROUND

Modern developments in electricity production have produced an increased requirement for energy storage. Many forms of renewable energy, such as wind turbines and photoelectric solar systems, produce energy in a variable fashion. For example, wind turbines may produce relatively large amounts of power when the wind is locally suitable, and produce nothing when the wind stops.

This may be compensated for in the grid as a whole by factors such as variable load demands, geographical diversity of wind generators, and accessing alternative generators. However, this does not allow the wind generator to controllably deliver power when the price is optimised. Further, there is no ability to smooth the power output even over a time frame of minutes, so that it is difficult for the grid operator to provide properly regulated power, especially given that the wind generator may be remotely positioned on the grid relative to the bulk of electricity consumers.

Energy storage systems of various kinds have accordingly come into wider consideration, so that outputs can be smoothed, or even stored for later re-sale or use. Energy storage battery arrays, typically may be utilized in such energy storage systems associated with renewable energy production.

Such arrays may, in one form, consist of several hundred lead acid batteries. The battery array is generally contained in structures or cabinets. In a larger installation, the batteries may be arranged in groups of 20 or so, called strings, which are connected to provide the overall facility.

The operation of the array necessarily generates heat, during charging and discharging in particular. The operating life of lead acid batteries is directly related to the temperature in which they operate. In particular, increasing the operating temperature for lead acid batteries tends to increase the corrosion of the positive grid. Similar negative effects exist for other battery technologies. Thus, in such arrays, careful attention is required to temperature management.

One approach is to provide active cooling, using air conditioning, heat exchangers, and associated fans. However, such cooling is effectively a parasitic load on the storage system, as it then requires additional battery capacity to be provided in order to operate the cooling system. Further, such an approach necessarily increases capital cost, and reduces the efficiency and effectiveness of the storage system.

Another important constraint is footprint. If the batteries could be spaced an arbitrarily large distance apart, then the issue of cooling could be readily resolved. However, in real world installations, floor space is a limited resource. Additional considerations of the length (and hence cost) of connections between batteries, safety, protection of the batteries and avoiding trip hazards make such solutions impractical.

It is an object of the present invention to provide an arrangement for a battery array which reduces (or eliminates) the requirement for active cooling, while improving the cost effectiveness of the storage system.

SUMMARY

In a first broad form, the present invention provides an array of batteries in which batteries at a higher level in the physical structure are spaced further apart from each other than those on the lower levels. In a suitable implementation, this allows for a more even temperature to be maintained across the array.

According to one aspect, the present invention provides an electrical storage unit including an array of batteries, wherein the batteries in the array are positioned at different heights relative to each other, and wherein the average spacing between the batteries on higher levels is larger than for the batteries on lower levels, and wherein the array is designed so that air flows via convection past the batteries.

In one form, the batteries are contained in a cabinet, having a chimney structure, so that the air is drawn from around the lower batteries, past the higher battery levels, and out of the chimney.

The present invention accordingly allows for passive cooling of the array without a requirement for additional power, and further in suitable implementations will maintain a relatively constant temperature across the entire array of batteries.

BRIEF DESCRIPTION OF THE DRAWINGS

Illustrative implementations of the present invention will now be described with reference the accompanying figures, in which:

FIG. 1 is an front elevation view illustrating one embodiment of the present invention;

FIG. 2 is a side view of the embodiment of FIG. 1; and

DETAILED DESCRIPTION OF THE EMBODIMENT(S)

Figure 3:
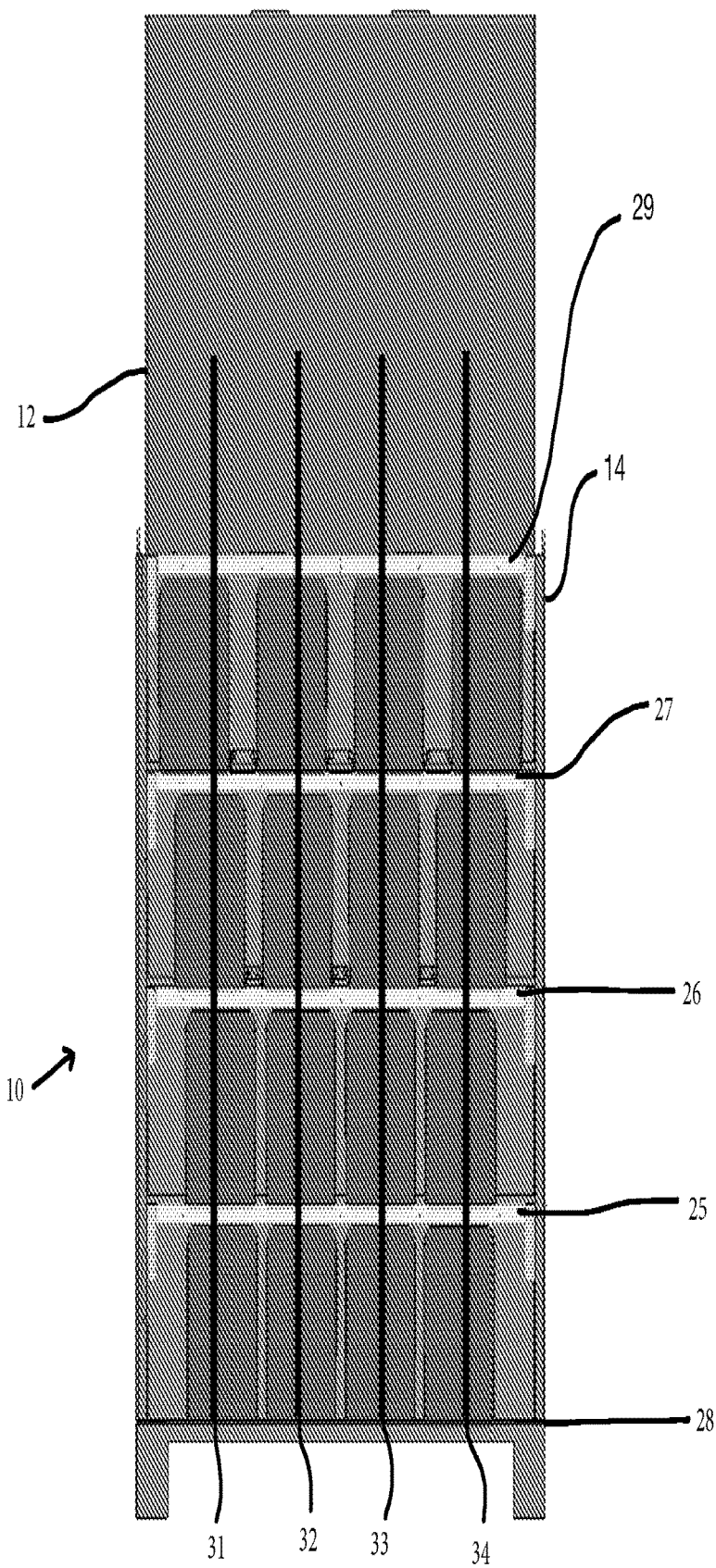
FIG. 3 is a rear elevation, partly in section, of the embodiment of FIG. 1.

An embodiment of the present invention will be primarily described with reference to a lead acid battery implementation, more particularly a lead acid UltraBattery implementation. However, the principle of the present invention can be applied to other chemical storage systems, for example lithium polymer, lithium ion, sodium sulphide, nickel cadmium, or any other such chemical system. It is applicable to any storage array where there are a relatively large number of individual cells or batteries, and the operation of those cells or batteries produces undesired heat. When the term battery is used throughout the description and claims, it is intended to extend to these types of batteries and storage systems such as but no limited to back up power supplies, unless the context indicates otherwise.

It is common, in an installation, for numbers of batteries to be arranged in strings and mounted in cabinets. These are connected and managed together. A number of strings may be connected to provide the overall storage facility.

It will be appreciated that the examples provided are intended as illustrative of implementations of the present invention, and should not be considered as limitative of the scope of the invention. Many alternative implementations are possible, as will be apparent to those skilled in the art.

The inventors have identified that it is highly desirable to keep all the batteries in an array at more or less the same temperature. If one battery is not in an equivalent state to its neighbors, this has an adverse effect upon the string as a whole.

In particular, the inventors have identified that it is desirable to try and keep the temperature of the array within a specific range of variation, preferably less than or equal to 3° C. across the string. This desirably is achieved using, as far as possible, convection airflows to minimise the requirement for forced cooling. It will be appreciated that the present invention is not limited to as specific temperature variation target, and that this is provided by way of example rather than limitation.

Referring to FIG. 1, one embodiment of the present invention is illustrated. Cabinet 10 provides a generally sealed enclosure, apart from air inlet vents created by the spacing of the batteries 20. The cabinet 10 has sides 14, and control electronics 13 located near the top of the cabinet. Chimney 12 extends all the way to the base, and opens onto each level of batteries 20, as will be explained further below.

Convection air flow occurs when air rises above a source of heat. The temperature difference between the inside and outside of a chimney 12 creates a natural draft or convection flow. Within in the cabinet 10, the batteries 20 are sources of heat. The chimney 12 produces an updraft. Since the only air inlet is the gap between the batteries 20, cooler outside air is drawn past the sides of the batteries 20 creating a cooling effect. The different apertures between the batteries 20 on different rows varies the amount of air that can be drawn past the batteries 20. This means the batteries 20 with wider spacing experience a greater cooling effect than those with narrower spacing. Since the batteries 20 are also heated up by those around, and especially those underneath them (in general the batteries 20 at the top will be warmer than those at the bottom for this reason), this difference in airflows facilitates more even temperature across all the batteries 20 in the cabinet.

Referring to FIG. 3, it shows a rear view of cabinet 10, with the rear cover removed. It can be seen that baffles 31, 32, 33 and 34 extend from base 28 up to above the top 29 of the top shelf, within the chimney 12 at the rear of the cabinet 10. Baffles 31, 32, 33 and 34 abut the shelves 25, 26, and 27. As such, they operate to separate the inter battery gaps, and provide for a passage for convective airflow between and around the batteries 20 and into the chimney 30.

In the embodiment shown, there are 16 identical batteries 20. The base 28 and shelves 25, 26, 27 define levels 21, 22, 23 and 24 respectively. Shelves 25, 26, 27 may be of any suitable type, but are preferably solid. Each level has 4 batteries 20. The batteries in this example have dimensions of approximately 175 mm wide×260 mm high×450 mm deep. The spacings between the batteries vary, and increase at the higher shelves. Specifically, the batteries on level 21 are 20 mm apart; on level 22, 25 mm apart; on level 23, 35 mm apart; and on level 24, 50 mm apart.

It will be appreciated that these are spacings which have been selected for this specific embodiment, and the that invention may be implemented with different spacing as appropriate to the dimensions, application and battery types and roles in a particular application.

The increasing spacings as the batteries are positioned at greater heights are selected so as to maintain a more even temperature variation across the string of batteries. The balancing of the desire to minimize temperature, so as to optimise each particular battery's life, and the advantages of achieving a relatively small temperature variation across the entire string, so that the life of all the batteries in the string is as similar as possible, is achieved with this arrangement.

Of course, the present invention can be implemented using many different geometries and arrangements. There may be more or less than 4 levels. The spacing will vary with loads. The principle does not require batteries to be arranged in specific planes, although that is a convenient implementation. Different sizes and types of batteries could be mixed in the string, although this is not preferred in view of the desire to have similar working lives for each battery in the string.

The present invention does not preclude the concurrent use of forced cooling, for example using fans, air conditioning, heat exchangers, etc. However, application of the present invention can be used to minimize the requirement for forced cooling, or in some cases to remove it altogether.

The implementation of the cabinet shown in the FIGS. 1 and 2 is intended to operate in combination with a large number of similar units in a practical installation. For example, multiple strings as shown could be connected front to back, or back to back, in a large installation. However, the arrangement within each unit may remain the same.

It will be appreciated that the present invention is concerned with the mechanical and physical positioning of the batteries, in order to manage air flow and temperature variation. The batteries can be charged, connected and managed from an electrical perspective in any suitable way, as will be apparent to hose skilled in the art.

The invention claimed is:

1. A battery array comprising:
   a cabinet having a plurality of shelves and a chimney extending along a side of the shelves; and
   a plurality of batteries being positioned on the shelves at different height levels relative to each other, the cabinet being open to each of the batteries in an open direction extending perpendicular to a longitudinal direction of the chimney on a side opposite the chimney, wherein an average spacing between the batteries on higher levels is larger than that of the batteries on lower levels, a spacing direction between the batteries is perpendicular to the longitudinal direction of the chimney and the open direction of the cabinet, and wherein the array is arranged so that air flows via convection into the open side of the cabinet opposite the chimney, past the batteries including being drawn from the batteries on the lower levels to the batteries on the higher levels, and out of the chimney.

2. A battery array according to claim 1, wherein each shelf communicates with the chimney to provide air flow.

3. A battery array according to claim 2 further comprising baffles extending from a base of the cabinet toward a top of the cabinet.

4. A battery array according to claim 3 wherein the baffles are located within the chimney.

5. A battery array according to claim 4 wherein the baffles abut the shelves.

6. A battery array according to claim 1 wherein the batteries on a lower level are arranged at a first spacing relative to each other.

7. A battery array according to claim 6 wherein the batteries on a higher level are arranged at a second spacing relative to each other wherein the first spacing is less than the second spacing.

8. A battery array according to claim 1, wherein the batteries are positioned at at least three different height levels, the average spacing between the batteries on higher levels is progressively larger than that of the batteries on lower levels.

9. A battery array according to claim 2, wherein the batteries are not disposed in the chimney.

10. A battery array according to claim 2, wherein each shelf communicates separately with the chimney.

11. A battery array according to claim 1, wherein the chimney extends above a battery positioned at a highest level.

12. A battery array according to claim 4, wherein the baffles extend along the longitudinal direction of the chimney and separate the chimney into a plurality of air passageways.

13. A battery array according to claim 12, wherein the number of air passageways in the chimney corresponds to the number of batteries on each shelf.

14. A battery array according to claim 8, wherein each of the at least three different height levels corresponds to a different shelf and at least three of the plurality of batteries are disposed on each shelf.

15. A battery array according to claim 11, wherein the air exits the chimney in the longitudinal direction of the chimney at a position higher than the battery positioned at the highest level.

16. A battery array according to claim 1, wherein a height direction of the shelves is parallel to the longitudinal direction of the chimney.

17. A battery array comprising:

a cabinet having a plurality of shelves and a chimney extending along a side of the shelves, each shelf communicates with the chimney to provide air flow;

a plurality of baffles located within the chimney and extending from a base of the cabinet toward a top of the cabinet, the baffles extending along a longitudinal direction of the chimney and separating the chimney into a plurality of air passageways; and a plurality of batteries being positioned on the shelves at different height levels relative to each other, the cabinet being open to each of the batteries in an open direction extending perpendicular to the longitudinal direction of the chimney on a side opposite the chimney, wherein an average spacing between the batteries on higher levels is larger than that of the batteries on lower levels, and wherein the array is arranged so that air flows via convection into the open side of the cabinet opposite the chimney, past the batteries including being drawn from the batteries on the lower levels to the batteries on the higher levels, and out of the chimney.

18. A battery array according to claim 17, wherein the number of air passageways in the chimney corresponds to the number of batteries on each shelf.

* * * * *